US011225926B2

(12) United States Patent
Tanis

(10) Patent No.: US 11,225,926 B2
(45) Date of Patent: Jan. 18, 2022

(54) METHOD AND SYSTEM FOR PROGRAMMING AN INTERNAL COMBUSTION ENGINE CONTROL UNIT

(71) Applicant: Caterpillar Inc., Peoria, IL (US)

(72) Inventor: Derek A. Tanis, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 109 days.

(21) Appl. No.: 16/720,881

(22) Filed: Dec. 19, 2019

(65) Prior Publication Data

US 2021/0189989 A1 Jun. 24, 2021

(51) Int. Cl.
*F02D 41/24* (2006.01)
*F02D 41/26* (2006.01)
*F02D 41/18* (2006.01)
*F02D 45/00* (2006.01)

(52) U.S. Cl.
CPC ....... *F02D 41/2432* (2013.01); *F02D 41/263* (2013.01); *F02D 41/18* (2013.01); *F02D 45/00* (2013.01)

(58) Field of Classification Search
CPC .... F02D 41/2432; F02D 41/263; F02D 41/18; F02D 45/00
See application file for complete search history.

(56) References Cited

U.S. PATENT DOCUMENTS 7,415,389 B2 8/2008 Stewart et al.
8,078,389 B2 12/2011 Huang et al.
8,612,107 B2 12/2013 Malikopoulos
2006/0041355 A1\* 2/2006 Blundell .................. B62D 6/04
701/41
2018/0112580 A1\* 4/2018 Suljanovic ........... G06Q 10/067

FOREIGN PATENT DOCUMENTS

| CN | 104596770 B | 3/2017 |
| CN | 104408271 B | 7/2017 |
| CN | 109086545 A | 12/2018 |
| CN | 106066606 B | 6/2019 |

\* cited by examiner

*Primary Examiner* — Joseph J Dallo
(74) *Attorney, Agent, or Firm* — Bookoff McAndrews PLLC

(57) ABSTRACT

A method for programming an internal combustion engine control unit includes operating a test internal combustion engine at a first speed and a first torque while simulating a condition of the test internal combustion engine by restricting a flow of air to the test internal combustion engine to simulate altitude variations of the test internal combustion engine or elevating a temperature of the flow of air to simulate ambient temperature variations of the test internal combustion engine. The method also includes measuring engine performance information while operating the test internal combustion engine at the first speed and first torque and while simulating the condition of the test internal combustion engine, and programming the internal combustion engine control unit by storing the measured engine performance information in a memory associated with the internal combustion engine control unit.

20 Claims, 3 Drawing Sheets

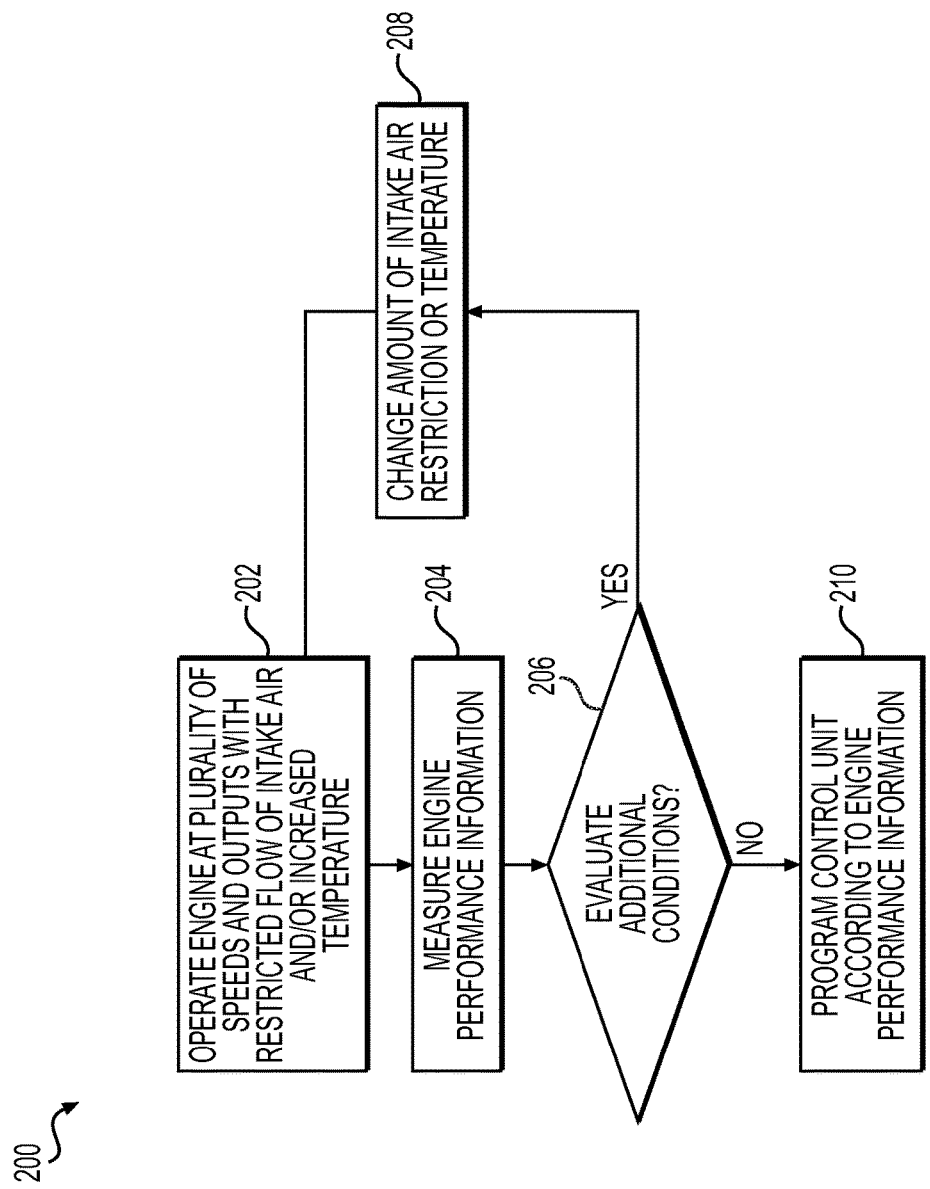

METHOD AND SYSTEM FOR PROGRAMMING AN INTERNAL COMBUSTION ENGINE CONTROL UNIT

TECHNICAL FIELD

The present disclosure relates generally to systems for controlling internal combustion engines, and more particularly, to methods and systems for establishing and using control data in an engine control system.

BACKGROUND

Internal combustion engine systems frequently include a control system including one or more engine control units that assist with control of the engine. These control units often operate in conjunction with sensors that detect the operating conditions of the engine. Together with stored data (e.g., look-up tables or maps), these detected conditions may help the control unit with control of the engine system. More recently, control units have been designed with models that use sensor information, maps, and other information to predict how an engine will perform under certain conditions. These predictions are then used to select an appropriate control for the engine system. The models may be derived from empirical data collected from actual internal combustion engine systems operating under various conditions. However, data for some engine conditions may be difficult, costly, and/or time consuming to accurately collect with a typical test engine. This can limit the ability of the model to accurately predict engine performance under such conditions. Therefore, appropriate control of the engine system may be compromised under these operating conditions.

A method of calibrating an engine control system is disclosed in U.S. Pat. No. 7,415,389 (the '389 patent) to Stewart et al. The testing system of the '389 patent may be used to determine how a single variable affects an internal combustion engine. The system may be used to determine an error signal between a desired value, such as a desired boost pressure, and a measured value, such as a measured boost pressure. Calibration parameters may be developed as a function of engine conditions and ambient conditions. While this method and test system may be useful in some circumstances, it may not be useful for predicting engine performance in various conditions, including conditions that are difficult to simulate.

The disclosed method and system may solve one or more of the problems set forth above and/or other problems in the art. The scope of the current disclosure, however, is defined by the attached claims, and not by the ability to solve any specific problem.

SUMMARY

In one aspect, a method for programming an internal combustion engine control unit may include operating a test internal combustion engine at a first speed and a first torque while simulating a condition of the test internal combustion engine by restricting a flow of air to the test internal combustion engine to simulate altitude variations of the test internal combustion engine or elevating a temperature of the flow of air to simulate ambient temperature variations of the test internal combustion engine. The method may also include measuring engine performance information while operating the test internal combustion engine at the first speed and first torque and while simulating the condition of the test internal combustion engine, and programming the internal combustion engine control unit by storing the measured engine performance information in a memory associated with the internal combustion engine control unit.

In another aspect, a method of calibrating an internal combustion engine control unit may include operating a test internal combustion engine at a plurality of engine speeds and engine outputs while simulating a condition of the test internal combustion engine and measuring engine performance information while operating the test internal combustion engine at the plurality of engine speeds and engine outputs under the simulated condition, wherein the simulated condition is at least one of a high-altitude condition or a high-temperature condition. The method may also include calibrating the internal combustion engine control unit by storing the measured engine performance information in a memory associated with the internal combustion engine control unit.

In yet another aspect, a system for programming an internal combustion engine control unit may include a test internal combustion engine, at least one sensor configured to generate a sensor signal indicative of a condition of the test internal combustion engine, and an intake air control device including at least one of an intake throttle valve or a heating device. The system may also include a controller configured to generate a control signal to control the intake air control device and determine engine performance information associated with a plurality of speeds and engine torques of the test internal combustion engine based at least in part on the sensor signal generated by the at least one sensor when the intake air control device restricts a flow of air to simulate altitude variations of the test internal combustion engine or increases a temperature of the air to simulate ambient temperature variations of the test internal combustion engine. The controller may also be configured to program the internal combustion engine control unit based on the engine performance information.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 3 is a flowchart of an exemplary method for programming a control unit of an internal combustion engine.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Moreover, in this disclosure, relative terms, such as, for example, "about," "substantially," "generally," and "approximately" are used to indicate a possible variation of ±10% in the stated value. As used herein "programming" and "generating" include creating, rewriting, updating, and/or modifying a program or information, including adding or supplementing information associated with an engine model and/or a control unit. As used herein, a flow of air is "restricted" when a device, such as an intake throttle valve, is placed in a position that reduces an amount of air provided to an internal combustion engine, as compared to an operation of this device for a particular engine output, engine speed, or both. As used herein, a temperature of a flow of air is "elevated" when a device, such as an intake air cooler, increases a temperature of intake air or cools the intake air by a lesser degree, as compared to an operation of this device for a particular engine output, engine speed, or both.

Figure 1:
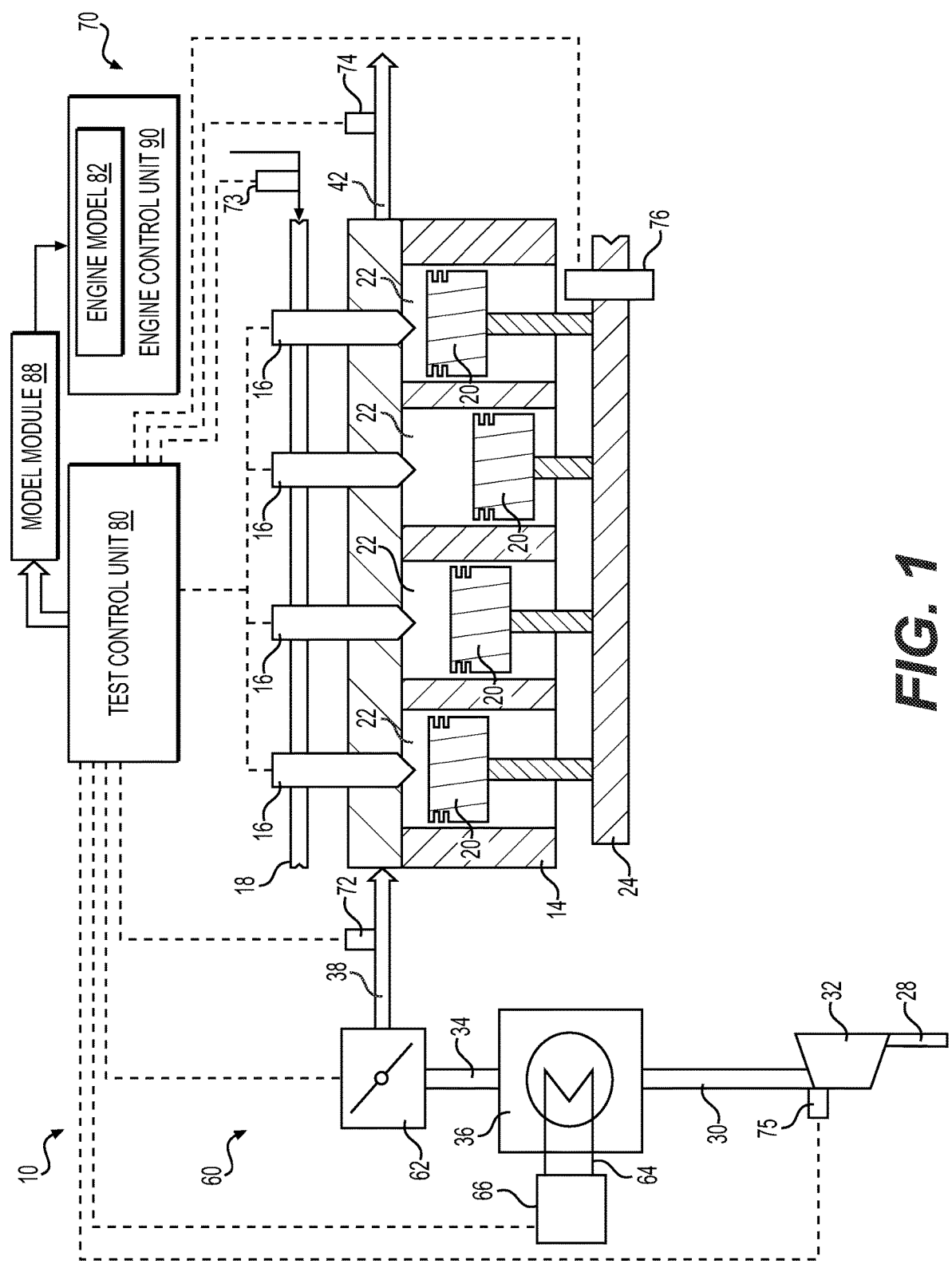
FIG. 1 is a schematic diagram illustrating an engine programming system according to an aspect of the present disclosure.

FIG. 1 is a schematic diagram illustrating an exemplary control unit calibration or programming system 10 for programming an engine control unit 90. Programming system 10 may include a test system 60, a model module 88, and an internal combustion engine 14 operably connected to test system 60. Test system 60 may be configured to monitor, control, and adjust test conditions, and may include a sensor system 70 and a test control unit 80. Internal combustion engine 14 may form an exemplary test engine for use in programming system, and may be any suitable engine, such as a diesel or gasoline engine. Engine 14 may be configured to combust a gaseous fuel, such as natural gas, either alone or with diesel (e.g., via a pilot injection of diesel). Internal combustion engine 14 may include a plurality of pistons 20 that reciprocate within respective combustion chambers 22 formed within a body of engine 14. Engine 14 may include a plurality of fuel injectors 16 to inject fuel, such as diesel fuel, into each combustion chamber 22. Combustion of fuel and air may generate power to drive crankshaft 24, which may be connected to downstream powertrain components (not shown) for outputting power to generate electricity, provide locomotion, drive one or more hydraulic systems, or perform other work. Fuel may be supplied to each fuel injector 16 by an engine fuel supply 18 (e.g., a fuel rail). Intake air may be provided to each combustion chamber 22 via an engine intake passage 38, such as an intake manifold, and at least one intake valve (not shown) for each combustion chamber 22. In an exemplary configuration, one or more air compressors 32 may be provided upstream of intake passage 38. Compressor 32 may be a compressor of a turbocharger configured to receive air from an intake 28. Air, whether ambient air or air supplied from compressor 32, may enter an air introduction passage 30 connected to an inlet of a cooler 36. A coolant path 64 may extend within cooler 36 to guide a flow of engine coolant or another fluid within cooler 36 to facilitate heat transfer between the coolant and air passing through cooler 36. A coolant supply device 66 may include one or more pumps, heat exchangers, and/or heaters to control a flow and a temperature of coolant within path 64. A connection passage 34 may extend from an outlet of cooler 36 to an intake throttle valve (ITV) 62. ITV 62 may be any suitable valve, such as a valve of a throttle body, configured to selectively restrict a flow of air therethrough. Combustion gases (exhaust) produced by the combustion of air and fuel may exit each combustion chamber 22 via one or more exhaust valves (not shown) for each combustion chamber 22. An exhaust passage 42, such as an exhaust manifold, may receive this exhaust. Exhaust passage 42 may direct a flow of exhaust to one or more aftertreatment devices (not shown) to reduce the amount of NOx, soot, hydrocarbons, etc., emitted from engine 14.

Test system 60 may include, in addition to sensor system 70 and test control unit 80, one or more environment-simulation control devices, such as ITV 62 and/or a coolant supply device 66, to control one or more environmental conditions. In one aspect, the one or more environment-simulation control devices may include an intake air control device configured to reproduce a condition associated with an elevated altitude, such as a restricted flow of available air. For example, ITV 62 may form an exemplary intake air control device, and may be placed in one or more partially-closed positions to reduce a flow of air therethrough. While ITV 62 may be an existing component of internal combustion engine 14, ITV 62 may instead be a test component included as part of test system 60 and removably connected to test engine 14. Thus, ITV 62 may be provided at locations other than the exemplary location illustrated in FIG. 1, such as upstream of compressor 32, or between compressor 32 and cooler 36. Additionally or alternatively, the one or more environment-simulation control devices may include coolant supply device 66, which may be configured to reproduce a condition in which ambient air has an elevated temperature. In an exemplary configuration, coolant supply device 66 may form a heating device that includes a coolant heater to raise a temperature of coolant provided to cooler 36. Thus, air passing through cooler 36 may be warmed via heat exchange, or cooled to a lesser degree, as compared to a normal operation associated with a particular engine output (torque).

Sensor system 70 may include a plurality of sensors associated with intake components, exhaust components, fuel supply components, etc., of internal combustion engine 14. In one aspect, one or more intake sensors 72 may be provided to monitor conditions and performance of the intake system. Intake sensors 72 may be provided in intake passage 38 downstream of ITV 62 and upstream of intake valves of engine 14. One or more intake sensors 72 may also be included in connection passage 34 (downstream of cooler 36 and upstream of ITV 62), air introduction passage 30 (upstream of cooler 36 and ITV 62), and/or within intake 28. Intake sensors 72 may include one or more of an air-flow sensor (e.g., mass air flow rate sensor), a pressure sensor (e.g., intake manifold absolute pressure (IMAP) sensor), or a temperature sensor (e.g., intake manifold temperature (IMAT) sensor). If desired, one or more of the intake sensors 72 may be provided at different locations within the intake system. One or more fuel sensors 73 may be provided to provide a signal indicative of a fuel rate, a fuel pressure, etc. Fuel sensors 73 may include one or more sensors included within a fuel path and/or fuel pump, for example, to determine a rate at which fuel is injected by injectors 16 and a pressure of fuel at the start of injection. Fuel sensors 73 may be part of test system 60, and may include one or more fuel rate sensors configured to measure a quantity of fuel injected via injectors 16. Fuel sensors 73 may be configured to measure an amount of fuel supplied from a fuel source (represented by an arrow in FIG. 1), such as a fuel pump, that supplies fuel to engine fuel supply 18. In one aspect, fuel may be provided to engine fuel supply 18 from a device associated with test system 60. One or more exhaust sensors 74 may be provided in an exhaust and/or aftertreatment system. Exhaust sensors 74 may include one or more of an exhaust temperature sensor, an exhaust gas recirculation (EGR) rate sensor (for engines 14 including EGR), sensors for measuring a temperature of an aftertreatment device, and/or sensors for detecting production, accumulation, and/or emission of NOx, soot, particulate matter, and/or hydrocarbons. Exhaust sensors 74 may also include one or more of an air-flow sensor, sensor(s) to detect presence of oxygen, or any other suitable sensor associated with an exhaust system. When a compressor 32, such as a compressor of a turbocharger, is present to provide compressed air to engine 14, sensor system 70 may include one or more turbocharger sensor(s) 75 that detect a speed of the turbocharger and/or a temperature at an outlet of the compressor 32 of the turbocharger. Sensor system 70 may also include one or more engine test sensor(s) 76, such as an engine speed sensor configured to measure a rotation and/or position of crankshaft 24. Engine test sensors 76 may also include an engine output sensor (e.g., torque sensor) configured to measure an output, such as torque, of engine 14. A load device, such as a brake, may be secured to crankshaft 24 and controlled by test control unit 80 to apply a load in a controllable manner.

Test control unit 80 may be configured to receive various sensed inputs or sensor signals generated or output from each sensor of sensor system 70 and generate commands or control signals to control the operation of fuel injectors 16, ITV 62, and coolant supply device 66. Test control unit 80 may also generate command signals to control, for example, a position of an EGR valve, a position of a vane of a variable geometry turbocharger, control of a turbocharger wastegate position, a position of the load device (brake), etc., during a test of test engine 14 to collect data (including engine performance information) under simulated altitude variations and/or temperature variations. For example, test control unit 80 may collect engine performance information while engine 14 operates under simulated conditions such as high-altitude (e.g., low barometric pressure or low ambient pressure) and/or high-temperature conditions. Test control unit 80 may be configured to store and/or update engine performance information measured during a test of test engine 14. Test control unit 80 may embody a single microprocessor or multiple microprocessors that receive inputs and issue control signals. These commands may allow test control unit 80 to cause injectors 16 to inject fuel according to a desired timing of a start of injection (SOI), fuel pressure at the start of injection (SOIP), quantity of injected fuel, and injection strategy (e.g., a number of injections, timing between injections, etc.). Test control unit 80 may include a memory, a secondary storage device, a processor, such as a central processing unit or any other means for accomplishing a task consistent with the present disclosure. The memory or secondary storage device associated with control unit 80 may store data and software to allow control unit 80 to perform its functions, including the functions described below with respect to method 200 (FIG. 3). In particular, such data and software in memory or secondary storage device(s) may allow test control unit 80 to store, generate, and/or update data, such as engine performance information, in model module 88. When this data is stored in a memory of model module 88, model module 88 may be configured to program engine control unit 90, by creating, updating, or supplementing engine performance information stored in a memory associated with engine control unit 90. Thus, the data generated and/or updated by test control unit 80 may be useful for calibration or programming of engine control unit 90.

Model module 88 may be any suitable hardware, software, or combination thereof, that is configured to program one or more engine control units 90. Model module 88 may be formed by a separate computing device, or may be implemented as software within test control unit 80. Model module 88 may include a memory, a secondary storage device, and a processor, such as a central processing unit. The memory associated with model module 88 may allow model module 88 to be programmed with any of the data (e.g., engine performance information) measured during method 200. Engine control unit 90 may include a memory, a secondary storage device, a processor, such as a central processing unit. Memory associated with engine control unit 90 may allow engine control unit 90 to store an engine model 82 and engine performance information. Numerous commercially available microprocessors can be configured to perform the functions of test control unit 80, model module 88, and engine control unit 90. Various other known circuits may be associated with test control unit 80 and engine control unit 90, including signal-conditioning circuitry, communication circuitry, and other appropriate circuitry.

Engine model 82 may correspond to any suitable model storing information that, when provided to memory associated with engine control unit 90, allows engine control unit 90 to issue commands to components of an engine to control the engine. For example, engine model 82 may include a mean value model, or other suitable model. A mean value model may be, for example, a simplified model of engine 14 that allows engine control unit 90 to predict the performance of engine 14 in real-time or near real-time. Engine model 82 may include one or more empirical relationships, control maps, or any other suitable information that allow engine control unit 90 to control an engine based on detected or calculated operating conditions. The engine control unit 90 may be programmed (e.g., updated and/or supplemented) with engine performance information obtained by engine programming system 10.

INDUSTRIAL APPLICABILITY

Control unit programming system 10 may be used to program or calibrate a control unit, such as engine control unit 90, for use with any appropriate machine or vehicle that includes an internal combustion engine. For example, engine control unit 90 may store an engine model 82 in a memory associated with engine control unit 90, that predicts how a production engine will operate under various conditions. For example, performance information may be stored in a memory of engine control unit 90 to predict an operation of engine 14 based on one or more simulated conditions, such as a simulated high-altitude condition or a simulated elevated intake air temperature. This programming may be provided to plurality of control units 90 for use with additional engines having the same or similar characteristics as test engine 14 used with programming system 10.

Figure 2:
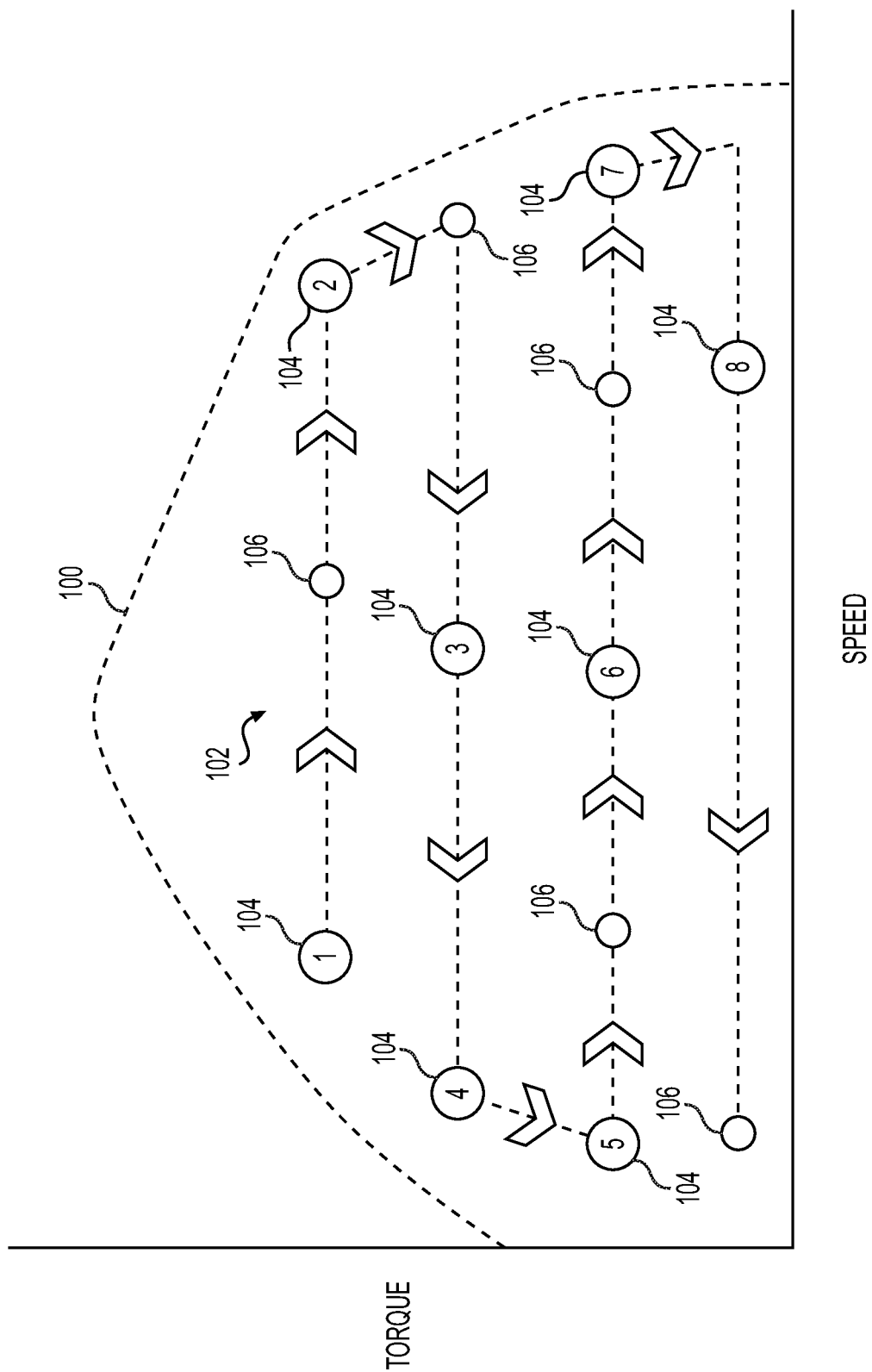
FIG. 2 is a chart illustrating an exemplary series of testing conditions used with the engine programming system of FIG. 1.

FIG. 2 is a chart illustrating an exemplary engine operating envelope 100, representative of various engine speeds and outputs (e.g., torques) corresponding to the capabilities of engine 14. A series of test points 102 within operating envelope 100 may represent a process for obtaining performance information, for use with engine model 82, under one or more simulated conditions. This process may employ a design of experiments in which engine 14 is operated at a plurality of different states while engine performance information is measured and recorded by sensor system 70 and control unit 80. Engine performance information may be recorded, for example, at each of a plurality of test points 102. Each test point 102 may correspond to a particular output (e.g., engine torque) and a particular engine speed, and may include a starting point 104 or a transition point 106. In one aspect, test control unit 80 may output commands to engine 14, e.g., to injectors 16, to cause engine 14 to generate a predetermined torque and operate at a predetermined speed associated with test point 102. In particular, the predetermined torque and predetermined speed may correspond to a rotation speed of crankshaft 24 and a predetermined torque generated at crankshaft 24. A design of experiments may include one or more test cycles in which engine 14 is operated at each of a plurality of test points 102, including starting points 104 and transition points 106, in a particular order. Each test cycle may begin at a different starting point 104 and may progress through one or more subsequent test points 102.

A first test point 102 (e.g., test point "1" in FIG. 2) may correspond to a maximum torque at which engine 14 operates during the programming process. At a beginning of a first test cycle, test control unit 80 may output commands to cause engine 14 to operate at a predetermined torque and a predetermined speed corresponding to the first test point 102. In one aspect, a simulated condition, such as a high-altitude and/or high-temperature condition, may be simulated during at least a portion of the test cycle. In order to simulate an exemplary high-altitude condition, one or more environment-simulation control devices, such as ITV 62, may be actuated. The environment-simulation control devices may simulate a most severe condition (e.g., largest restriction) at first test point 102 (first starting point 104). This most severe condition may be the largest restriction, for example, test engine 14 may experience while providing acceptable performance (e.g., no smoking) at the torque and speed associated with first starting point 104. This restrictive position may restrict a flow of air to combustion chambers 22 by an amount that results in a predetermined air-fuel ratio such as, for example, an air-fuel ratio of less than 24. In another aspect, the predetermined air-fuel ratio may be between 15 and 20, and, more particularly, approximately equal to 16. In some aspects, this restrictive position may be a position of ITV 62 that is between about 50-80% closed.

In an exemplary first test cycle performed under a first simulated condition (for example, a high-altitude environment condition simulated by placing ITV 62 in a predetermined restrictive condition), engine 14 may be operated at the speed and torque associated with first starting point 104 for at least a period of time sufficient to reach an approximately steady-state (non-transient). Various items of engine performance information or engine parameters may be recorded by test control unit 80 based on signals from sensors of sensor system 70 during this steady-state operation. Engine performance information may also be recorded in a transient state, such as a transition to the speed and output associated with first starting point 104. In addition to sensed information, one or more control signals output by test control unit 80 may be recorded as part of the engine performance information. In one aspect, measured engine performance information may include: an air-fuel ratio measured by exhaust sensor 74 (e.g., from a signal corresponding to a detected amount of oxygen present in the exhaust and/or exhaust temperature). IMAP, mass air flow rate, and/or boost pressure may be measured by intake sensor(s) 72. Measured engine performance information may also include production, accumulation, and/or emission of NOx, soot, particulate matter, hydrocarbons, EGR rate, and/or exhaust temperature measured by exhaust sensor(s) 74, boost pressure and compressor outlet temperature measured by turbo sensor(s) 75, and/or engine torque and engine speed may measured by engine test sensor(s) 76. SOI may be determined based on a command signal issued from control unit 80 to injectors 16, while SOIP may be determined by fuel pressure measured by fuel sensor(s) 73 at a timing corresponding to one or more command signals to initiate injection. A vane position of a VGT, or a position of a wastegate (e.g., of a turbine for driving compressor 32) may be measured based on command signals from control unit 80. Engine 14 may be operated at the speed and output of first starting point 104 for a period of time sufficient to allow one or more of these items of engine performance information to reach an approximately steady-state condition. If desired, an average value of one or more of these items of information for a plurality of engine cycles may be measured and recorded by control unit 80 based on information from sensor system 70.

Once items of the above-described engine performance information have been recorded for first starting point 104, test control unit 80 may cause engine 14 to operate at a second speed and a second torque for a second test point 102 (e.g., a transition point 106). At least one of the second speed or second toque may be different than the first speed and first output. Test control unit 80 may measure and record engine performance information once engine 14 achieves steady-state operation, and may also measure and record engine performance information during a transient state between first starting point 104 and the second test point 102. The simulated condition may be maintained during the transition from the first test point to the second test point 102, and may also be maintained during steady-state operation at the second test point 102. For example, the amount of restriction may be held at a constant level as the amount of restriction performed when operating engine 14 according to first starting point 104. This may be achieved, for example, by maintaining a position of ITV 62 constant for at least some, or for all, test points 102. When engine performance information has been recorded for transition point 106, control unit 80 may cause engine 14 to proceed to a third test point 102 (e.g., second starting point 104), while maintaining the simulated condition (e.g., the same amount of intake air restriction).

Engine performance information may continue to be recorded while progressing test engine 14 through the remaining test points 102. In one aspect, during this progression, each test point 102 may be associated with an engine output torque that is equal to, or less than, the torque output by test engine 14 for the preceding test points 102. Due to this, it may be possible to apply a first simulated condition (first amount of intake air restriction) at first starting point 104, and to maintain this condition at each subsequent test point 102.

A second test cycle may be performed to evaluate a second simulated condition. This second test cycle may begin at a second starting point 104, (such as the starting point 104 labelled "2" in FIG. 2). In one aspect, the second simulated condition may simulate a largest restriction that test engine 14 may experience while providing acceptable performance (e.g., no smoking) at the torque and speed associated with second starting point 104.

While the torque associated with second starting point 104 may be the same in both the first and second test cycles, the speed may be different (e.g., higher). The higher amount of restriction may be possible in the second cycle, for example, as the higher engine speed associated with the second starting point may tend to draw air into combustion chambers 22. A higher amount of restriction may also be possible in the second cycle, as the second starting point 104 may be associated with a lower torque. Third or subsequent test cycles may be performed with the remaining starting points 104, which may form initial test points 102 for these cycles. Starting points 104 may be associated with generally lower torques. Thus, test cycles may be generally be associated with more restrictive positions of ITV 62. For example, seven or more test cycles with the same number of different simulated conditions may be evaluated, with starting points 104 with lower outputs evaluated at progressively higher levels of restriction, by progressively closing ITV 62. When the simulated condition is a high-temperature condition, it may be desirable to perform each test cycle from a single starting point 104. Thus, different high-temperature conditions may be simulated (e.g., by coolant supply device 66) for a respective plurality of test cycles.

FIG. 3 illustrates a flowchart of an exemplary method 200 for programming an internal combustion engine control unit 90. In a step 202, test engine 14 may, based on control signals from test control unit 80, operate at a plurality of speeds and outputs while simulating a condition of test engine 14 (e.g., restricting a flow of intake air, increasing intake air temperature, or both). For example, test engine 14 may be operated at a plurality of different test points 102, including one or more starting points 104 and one or more transition points 106. In a step 204, which may be performed at least partially concurrently with step 202, engine performance information may be measured while engine 14 operates at a speeds and torques corresponding to respective test points 102. The measurement of performance information may include storing performance information within a memory associated with control unit 80. Steps 202 and 204 may be performed while the simulated condition is maintained approximately constant for an entire test cycle.

Step 206 may include determining whether to evaluate one or more additional simulated conditions, such as other levels of intake restriction and/or other increased air intake temperatures. This may be performed, for example, prior to initiating a second or subsequent test cycle. When the determination of step 206 is affirmative, the position of ITV 36 may be changed in step 208, and a second or subsequent test cycle may be performed by repeating steps 202 and 204 with the changed amount of restriction. When the determination in of step 206 is negative, method 200 may proceed to step 210, which may include calibrating or programming engine control unit 90. In one aspect, this programming may include storing (creating, updating and/or supplementing) engine performance information in a memory associated with model module 88. For example, step 206 may include supplementing or updating existing engine performance information (e.g., by adding performance information measured in step 204 to performance information that was acquired without simulating altitude variations or temperature variations). This engine performance information may then be provided to engine control unit 90 for use with engine model 82. The performance information provided by model module 88 may be provided for an engine model 82 pre-programmed in engine control unit 90, or may be included together with engine model 82 to program engine control unit 90. Step 210 may also include supplementing, modifying, or replacing, an existing engine model 82 stored in a memory of engine control unit 90.

If desired, transition points 106 may be eliminated from one or more test cycles (i.e., a test cycle may include only a series of starting points 104). Additionally, while first and second test cycles are described herein, the terms "first" and "second" are used in the interest of clarity, as test cycles may be performed in any desired order. Additionally, test cycles may be completed on an intermittent basis. For example, the first three (or any number of) test points 102 of a first test cycle may be performed at a first time, followed by three (or any number) test points 102 of a second test cycle. In such a case, the position of ITV 62 may be adjusted as necessary.

While an exemplary order of test points 102 is illustrated in FIG. 2, including a plurality of transition points 106, transition points 106 may be eliminated from one or more test cycles if desired. Additionally, while first and second test cycles are described herein, the terms "first" and "second" are used in the interest of clarity, as test cycles may be performed in any desired order. Additionally, test cycles may be completed on an intermittent basis. For example, any number of test points 102 of a first test cycle may be performed at a first time, followed by any number of test points 102 of a second test cycle. In such a case, the position of ITV 62, and/or a temperature imposed by coolant supply 66 may be adjusted as necessary.

The performance of one or more test cycles according to a design of experiments, as described herein, may provide improved training data for use with an engine model. This improved data may better represent acceleration events, or better represent operation of engine 14 at high altitudes and elevated temperatures. In one example, this data may be employed to train an engine model 82, which may include a mean value model, in a manner that increases accuracy by providing information for various conditions. Thus, performance of an engine control unit may be improved, in particular during acceleration events, particularly when such events at high altitude or at elevated temperature conditions, as engine model 82 may include more detailed information regarding optimum calibration parameters under these conditions, including SOI, SOIP, EGR flow rate, ITV position, VGT vane position, wastegate control, and/or other parameters. In one aspect, the process of programming the engine model 82 may be completed in a single day by providing a plurality of test points along a discrete path, with a fixed ITV position and/or a fixed IMAT. Moreover, this system may provide engine performance information for conditions that are difficult to evaluate with conventional test methods and systems, such as low air-fuel ratios and high intake manifold air temperatures.

It will be apparent to those skilled in the art that various modifications and variations can be made to the disclosed method and system without departing from the scope of the disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A method for programming an internal combustion engine control unit, the method comprising:
operating a test internal combustion engine at a first speed and a first torque while physically simulating a condition of the test internal combustion engine by restricting a flow of air to the test internal combustion engine to physically simulate altitude variations of the test internal combustion engine or by elevating a temperature of the flow of air to physically simulate ambient temperature variations of the test internal combustion engine;
operating an intake air control device including at least one of an intake throttle valve or a heating device to physically simulate the condition of the test internal combustion engine;
measuring engine performance information while operating the test internal combustion engine at the first speed and first torque and while physically simulating the condition of the test internal combustion engine; and programming the internal combustion engine control unit by storing the measured engine performance information in a memory associated with the internal combustion engine control unit.

2. The method of claim 1, wherein programming the internal combustion engine control unit includes supplementing existing performance information stored in the memory with the measured engine performance information.

3. The method of claim 1, wherein the condition is simulated by restricting the flow of air to the test internal combustion engine with the intake air control device, and wherein the method includes operating the test internal combustion engine at a second speed and a second torque while restricting the flow of air by a same amount as an amount of restriction of the flow of air while operating at the first speed and first torque.

4. The method of claim 1, wherein the engine performance information is measured during a transition of the test internal combustion engine from the first speed and first torque to a second speed and a second torque.

5. The method of claim 1, wherein the engine performance information includes at least one of an exhaust temperature, an intake pressure, a fuel rate, an NOx emission, a soot accumulation, a carbon monoxide emission, or a hydrocarbon emission.

6. The method of claim 1, wherein programming the test internal combustion engine model includes providing a mean value model in the control unit.

7. The method of claim 1, wherein the restricted flow of air corresponds to an air-fuel ratio of less than about 20.

8. A method for calibrating an internal combustion engine control unit, the method comprising:
operating a test internal combustion engine at a plurality of engine speeds and engine outputs while simulating a condition of the test internal combustion engine;
measuring engine performance information while operating the test internal combustion engine at the plurality of engine speeds and engine outputs under the simulated condition, wherein the simulated condition is at least one of a high-altitude condition or a high-temperature condition that is physically simulated by operating an air intake control device including at least one of an intake throttle valve or a heating device; and
calibrating the internal combustion engine control unit by storing the measured engine performance information in a memory associated with the internal combustion engine control unit.

9. The method of claim 8, wherein the simulated condition is the high-altitude condition and the high-altitude condition is simulated by partially closing an intake throttle valve of the air intake control device to restrict a quantity of air provided to a combustion chamber of the test internal combustion engine.

10. The method of claim 9, wherein the engine performance information is measured at a plurality of different engine speeds and a plurality of different engine torques while restricting a flow of air to the test internal combustion engine by a constant amount.

11. The method of claim 8, wherein the simulated condition is the high-temperature condition, and wherein the high-temperature condition is simulated by increasing a temperature of air provided to the test internal combustion engine with the air intake control device.

12. The method of claim 11, wherein the engine performance information is measured while maintaining the temperature of air provided to the test internal combustion engine at a substantially constant elevated temperature for at least some of the plurality of engine speeds and engine outputs.

13. A system for programming an internal combustion engine control unit, the system comprising:
a test internal combustion engine;
at least one sensor configured to generate a sensor signal indicative of a condition of the test internal combustion engine;
an intake air control device including at least one of an intake throttle valve or a heating device; and
a controller configured to:
generate a control signal to control the intake air control device;
determine engine performance information associated with a plurality of speeds and engine torques of the test internal combustion engine based at least in part on the sensor signal generated by the at least one sensor when the intake air control device restricts a flow of air to simulate altitude variations of the test internal combustion engine or increases a temperature of the air to simulate ambient temperature variations of the test internal combustion engine; and
program the internal combustion engine control unit based on the engine performance information.

14. The system of claim 13, wherein the intake air control device includes the intake throttle valve and the controller is configured to cause the intake throttle valve to restrict the flow of the air while measuring the engine performance information.

15. The system of claim 14, wherein the controller is configured to measure engine performance information at a plurality of different engine speeds and a plurality of different engine torques while restricting the flow of the air by a constant amount.

16. The system of claim 15, wherein the restricted flow of air corresponds to an air-fuel ratio of less than about 20.

17. The system of claim 13, wherein the intake air control device includes the heating device, the heating device being configured to increase a temperature of the air while determining the engine performance information.

18. The system of claim 17, wherein the controller is configured to measure engine performance information while maintaining the temperature of the air at a constant elevated temperature.

19. The system of claim 13, wherein programming the internal combustion engine control unit includes storing the engine performance information for use with a mean value model stored in the internal combustion engine control unit.

20. The system of claim 13, wherein the engine performance information includes at least one of an exhaust temperature, an intake pressure, a fuel rate, an NOx emission, a soot emission, a carbon monoxide emission, or a hydrocarbon emission.

* * * * *